(12) United States Patent
Wu

(10) Patent No.: US 6,977,702 B2
(45) Date of Patent: Dec. 20, 2005

(54) REFLECTIVE AND TRANSFLECTIVE LIQUID CRYSTAL DISPLAY USING A WIRE GRID POLARIZER

(75) Inventor: Shin-Tson Wu, Oviedo, FL (US)

(73) Assignee: University of Central Florida, Orlando, FL (US)

( * ) Notice: Subject to any disclaimer, the term of this patent is extended or adjusted under 35 U.S.C. 154(b) by 679 days.

(21) Appl. No.: 10/428,386

(22) Filed: May 2, 2003

(65) Prior Publication Data
US 2003/0210369 A1 Nov. 13, 2003

Related U.S. Application Data
(60) Provisional application No. 60/378,862, filed on May 7, 2002.

(51) Int. Cl.$^7$ .......................................... G02F 1/1335
(52) U.S. Cl. ..................................... 349/115; 349/113
(58) Field of Search .................... 349/113, 114, 115, 349/96

(56) References Cited
U.S. PATENT DOCUMENTS

| | | | |
|---|---|---|---|
| 4,688,897 A * | 8/1987 | Grinberg et al. ............ 349/162 |
| 5,764,324 A | 6/1998 | Lu et al. ...................... 349/113 |
| 5,986,730 A * | 11/1999 | Hansen et al. ................ 349/96 |
| 6,008,871 A * | 12/1999 | Okumura ...................... 349/61 |
| 6,108,131 A | 8/2000 | Hansen et al. .............. 359/486 |
| 6,124,971 A * | 9/2000 | Ouderkirk et al. .......... 359/487 |
| 6,281,952 B1 * | 8/2001 | Okamoto et al. ............. 349/12 |
| 6,295,109 B1 | 9/2001 | Kubo et al. ................. 349/119 |
| 6,330,047 B1 | 12/2001 | Kubo et al. ................. 349/147 |
| 6,341,002 B1 | 1/2002 | Shimizu et al. ............. 349/119 |

* cited by examiner

*Primary Examiner*—Toan Ton
(74) *Attorney, Agent, or Firm*—Brian S. Steinberger; Law Offices of Brian S. Steinberger, P.A.

(57) ABSTRACT

A device structure for single cell gap reflective and transflective liquid crystal displays (TF-LCDs). For an entirely reflective LCD, the imbedded wire-grid polarizer (WGP) serves as a polarization-dependent for the ambient light. For a transflective TF-LCD, the WGP only covers the reflective pixels. The disclosure also includes a method of using single cell gap liquid crystal displays (LCDs) without phase retardation films by providing a single cell gap LCD having reflective pixels and transmissive pixels, covering solely the reflective pixels, with at least one of: a wire grid polarizer and a broadband cholesteric reflector (BCR), reflecting ambient light off the reflective pixels; and passing back light through the transmissive pixels whereby the cell gap LCD obtains high contrast ratios without using phase retardation films.

15 Claims, 5 Drawing Sheets

Dark State

Bright State

FIG. 3a
Dark State
V=OFF
FIG. 3b
Bright State
V=ON
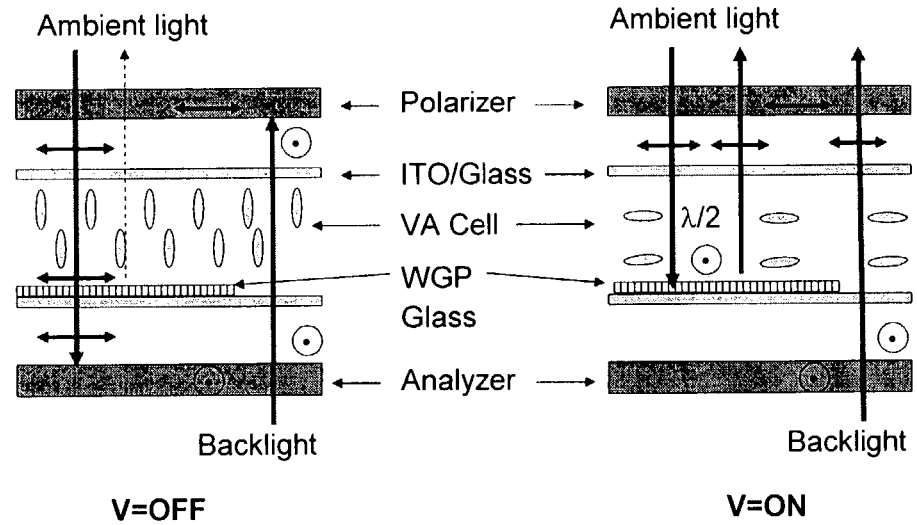
Fig. 4
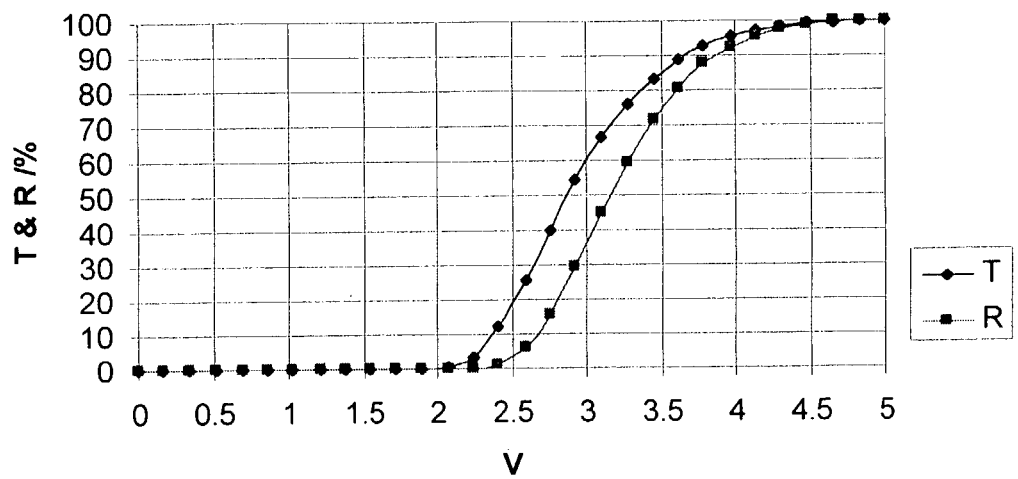

Bright State

V=OFF

Dark State

V=ON

Bright State

V=OFF

Dark State

V=ON

Left hand

Right hand

Fig. 9a
Fig. 9b
Dark State
Bright State
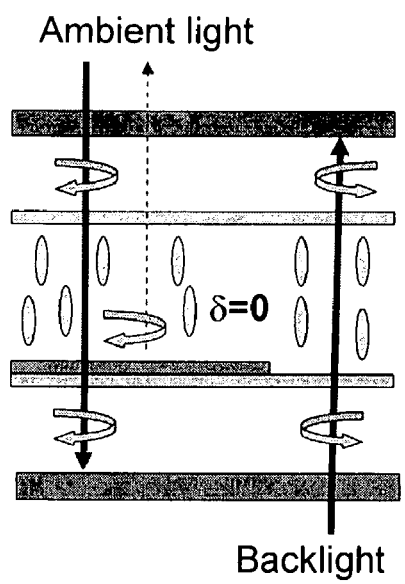
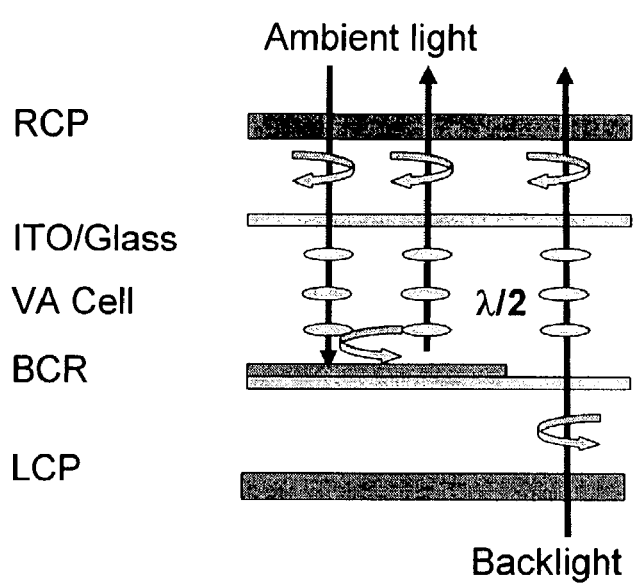
RCP
ITO/Glass
VA Cell
BCR
LCP
 Left hand
 Right hand

REFLECTIVE AND TRANSFLECTIVE LIQUID CRYSTAL DISPLAY USING A WIRE GRID POLARIZER

This invention relates to transmission-type liquid crystal displays, and in particular to methods and apparatus for using an imbedded wire-grid polarizer (WGP) which serves as a polarization-dependent reflector for ambient light and claims the benefit of priority based on U.S. Provisional Application No. 60/378,862 filed May 7, 2002.

BACKGROUND AND PRIOR ART

The transmission-type liquid crystal display (LCD) exhibits a high contrast ratio and good color saturation. However, its power consumption is high due to the need of a backlight. Under a bright ambient environment, the display is washed out by sunlight. On the other hand, a reflective LCD relies ambient light for displaying information contents. Since it does not require a backlight, its power consumption is reduced significantly. However, its contrast ratio is generally lower and color saturation is much inferior to those of the transmission type. At dark environments, a reflective LCD simply lost its visibility.

A transflective LCD has been taught by Sharp (U.S. Pat. Nos. 6,281,952 B1; 6,295,109 B1; 6,330,047 B1), where each pixel is split into R (reflective) and T (transmissive) sub-pixels. Usually, the R and T area ratio is 4:1, in favor of the reflective display. The transmissive display is intended to only be used for dark ambient conditions in order to conserve power.

Two basic types of transflective LCDs are known: single cell gap (see FIG. 1a hereafter) and double cell gap (see FIG. 1b hereafter).

A recent search in the United States Patent Office directed to the subject matter of the invention hereafter disclosed developed the following eight (8) U.S. patents:

U.S. Pat. No. 6,341,002 to Shimizu et al. describes a double cell-gap approach to obtain equal light efficiency and contrast ratio in Transflective LCDs. The cell gap of the T pixel is twice as large as that of R pixel and requires two phase compensation films;

U.S. Pat. No. 6,108,131 to Hansen et al. describes a technique for converting unpolarized light into a linearly polarized light, which deals with the light source for projection displays, rather than dealing with the display device itself;

U.S. Pat. No. 5,986,730 to Hansen et al describes a display structure that can be used for both reflective and transmissive devices in which a wire grid polarizer is used where the reflective and transmissive displays share the same pixels and covers the whole pixel;

U.S. Pat. No. 4,688,897 to Grinberg et al. similarly describes display devices using a wire grid polarizer as a reflector for reflective display devices;

U.S. Pat. No. 5,764,324 to Lu et al. describes a reflective display device using a conductive transparent electrode (the first substrate) that has the same work function as the reflective electrode (the second substrate) for reducing image sticking;

U.S. Pat. No. 6,281,952 B1 to Okimoto et al., which describes a transflective LCD using two cell gaps for the transmissive and reflective pixels;

U.S. Pat. No. 6,295,109 B1 to Kubo et al describes a LCD with two phase retardation films; and, U.S. Pat. No. 6,330,047 B1 to Kubo et al describes a LCD device with a LC layer disposed between two substrates with a transmissive electrode in one and a reflective electrode region in the other with a transmissive electrode in correspondence with each of the pixel areas.

For a better understanding of the prior art, reference should be made to FIG. 1a which shows a prior art view of a transflective LCD using a single cell gap, and to FIG. 1b which shows a prior art view of a transflective LCD using a double cell gap. In the single cell gap approach, the same cell gap (d) applies to both R and T modes. The cell gap is optimized for R-mode operation. As a result, the light transmittance for the T-mode is lower than 50% because the light only passes the LC layer once. In the double cell gap approach, the cell gap is d and 2d for the R and T sub-pixels, respectively. In this approach, both R and T can achieve high light efficiency. However, the T mode has four times longer response time than that of the R mode. A common problem for the above-mentioned approaches is that R and T pixels have different color saturation. For R pixels, the ambient light passes the color filter twice, but for T pixels the backlight only passes the color filter once. As a result, their color saturation is different.

It becomes very important to improve the color saturation of devices utilizing transflective LCDs, which is not available from the disclosures of the foregoing citations.

SUMMARY OF THE INVENTION

A primary objective of the invention is to provide reflective (R) and transflective liquid crystal displays using a wire grid reflector in a single cell gap structure for both R and transmissive (T) modes.

A secondary objective of the invention is to provide reflective LCDs and transflective LCDs using a single cell gap where its reflectance and transmittance are high.

A third objective of the invention is to provide reflective LCDs and transflective LCDs using a single cell gap that does not require any phase retardation film, such as quarter wave or half wave films.

A fourth objective of the invention is to provide reflective LCDs and transflective LCDs using a single cell gap that allows transmission type thin-film transistor liquid crystal substrates to be used for reflective displays.

In accordance with this invention there is provided a device for single cell gap reflective and transflective liquid crystal displays comprising: a single cell gap liquid crystal display (LCD) having reflective pixels and transmissive pixels; a wire grid polarizer solely covering the reflective pixels; ambient light reflecting off the reflective pixels; and back light passing through the transmissive pixels whereby the cell gap LCD achieves high contrast ratios without using phase retardation films and a method of using single cell gap liquid crystal displays (LCDs) without phase retardation films, comprising the steps of: providing a single cell gap LCD having reflective pixels and transmissive pixels; covering solely the reflective pixels, with at least one of: a wire grid polarizer and a broadband cholesteric reflector (BCR); reflecting ambient light off the reflective pixels; and passing back light through the transmissive pixels whereby the cell gap LCD obtains high contrast ratios without using phase retardation films.

Further objects and advantages of this invention will be apparent from the following detailed description of presently preferred embodiments, which are illustrated schematically in the accompanying drawings.

BRIEF DESCRIPTION OF THE FIGURES

FIGS. 3a and 3b shows the normally black mode using a vertically aligned (VA) LC cell.

FIG. 4 shows the computer simulated voltage-dependent transmittance (VT) and voltage-dependent reflectance (VR) curves for the normally black mode shown in FIG. 3.

FIG. 9a shows a normally black transflective LCD using a BCR, two circular polarizers and a VA LC cell with the voltage in an off-state.

FIG. 9b shows FIG. 9a with the voltage in an on-state.

DESCRIPTION OF THE PREFERRED EMBODIMENTS

Before explaining the disclosed embodiments of the present invention in detail, it is to be understood that the invention is not limited in its application to the details of the particular arrangements shown herein since the invention is capable of other embodiments. Also, the terminology used herein is for the purpose of description and not of limitation.

Figure 2:
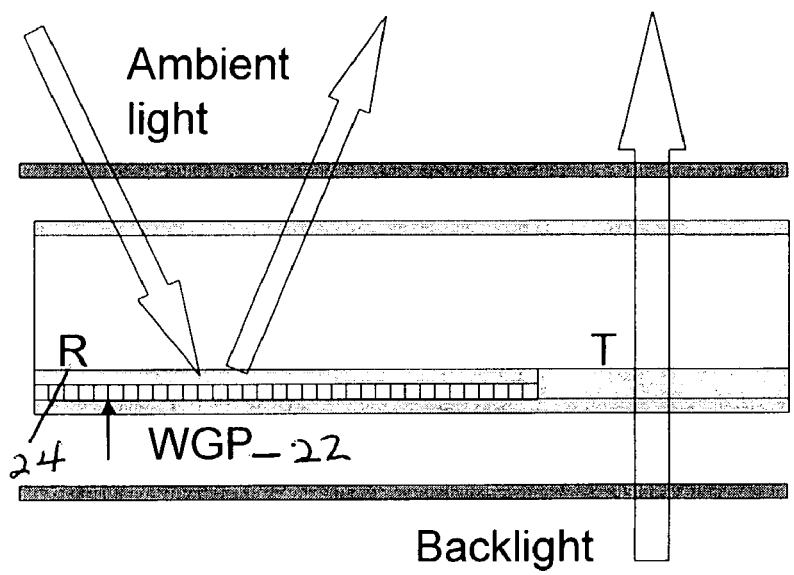
FIG. 2 shows a schematic of the transflective LCD of the invention with an imbedded wire grid polarizer on the reflective pixels.

The invention provides a new device structure according to the teachings of this invention for both the single cell gap reflective and transflective liquid crystal displays TF-LCDs. For an entirely reflective LCD, the imbedded wire-grid polarizer (WGP) serves as a polarization-dependent reflector for the ambient light. For a transflective LCD, the WGP 22 only covers the reflective pixels 24, as shown in FIG. 2. The transmissive pixels are covered with an indium-tin-oxide and polyimide LC alignment layer 26. Various LC alignments, such as 90° twisted nematic or homeotropic alignment can be used to achieve the normally white and normally black modes. The valuable uniqueness of this inventive approach is that this cell configuration does not require any phase retardation films while obtaining a high contrast ratio.

Figure 1A:
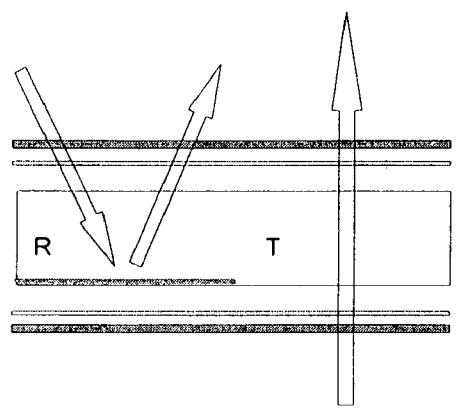
FIG. 1a shows a prior art view of a transflective LCD using a single cell gap structure.
Figure 1B:
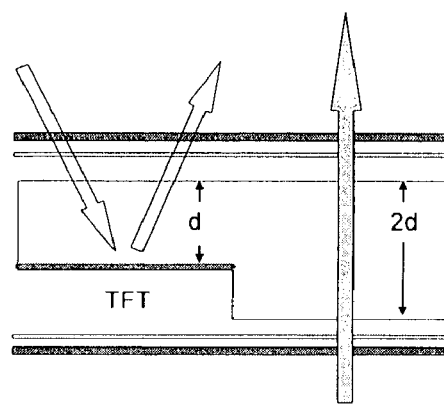
FIG. 1b shows a prior art view of a transflective LCD using a double cell gap structure.

As shown in FIG. 1(a), the prior art single cell gap approach has been disclosed by Sharp. The cell gap must be optimized for reflective pixels. As a result, the transmission efficiency is greatly sacrificed. The prior art double cell gap structure shown in FIG. 1(b) improves the transmission efficiency; however, when both reflective and transmissive images are present, the transmission pixels have 4× slower response time than that of the reflective ones. Another drawback of the approaches depicted in FIGS. 1a and 1b is that they need two quarter-wave films, with one on each side. The invention disclosed herein uses a single cell gap and it does not require any phase retardation film. Moreover, both high reflectance and high transmittance can be obtained with this invention as taught herein.

Flexibility in Choosing LC Modes

Both normally white (NW) and normally black (NB) modes can be realized depending on the LC alignment used. For a NB mode, vertical alignment (VA) using negative dielectric anisotropic LC is needed. On the other hand, for a NW mode, a 90° twisted nematic (TN) cell is used.

Normally Black Mode

FIGS. 3a and 3b shows the NB mode using a VA LC cell. In the voltage-off state, the LC directors are aligned nearly perpendicular to the substrates, except for a small pretilt angle (~2°). The top and bottom linear polarizers are crossed. Assume the top linear polarizer transmits the P-polarization of the incoming ambient light. When the P wave passes through the LC layer, it experiences no phase retardation. The wired grid polarizer is oriented in such way that it transmits the P wave and reflects the S wave. The transmitted P wave is then absorbed by the bottom linear polarizer and no light is reflected back. In the transmissive channel, the S wave of the backlight transmits the bottom linear polarizer and is absorbed by the top polarizer. Thus, both reflective and transmission pixels appear black.

When the applied voltage exceeds the threshold voltage, the LC directors are reoriented by the electric field (FIG. 3b). Since the LC employed has negative dielectric anisotropy ($\Delta\epsilon<0$), the directors are reoriented parallel to the substrate surfaces, as shown in the right diagram of FIG. 1. The LC cell is functionally equivalent to a $\lambda/2$ plate. The P wave of the incoming ambient light is converted to S wave and reflected by the WGP. The S wave traverses the LC half-wave plate once again, becomes P-wave, and finally transmits the top polarizer. Similarly, the S wave of the backlight is transmitted by the top polarizer and results in a bright state.

Good light efficiency and gray scales are two important parameters for a transflective LCD. FIG. 4 shows the computer simulated voltage-dependent transmittance (VT) and voltage-dependent reflectance (VR) curves for the normally black mode shown in FIGS. 3a and 3b. Both R and T pixels reach 100% light modulation efficiency at 5 volts. The voltage swing is less than $3V_{rms}$.

Normally White Mode

FIG. 5 depicts another embodiment of the invention using a 90°-TN cell. As shown in the left diagram, the P wave of the ambient light which passes the top polarizer follows the twist of the 90° TN cell and becomes S wave. The S wave is reflected by the imbedded wire grid polarizer. After passing the TN cell the second time, the S wave is turned into P wave and is transmitted by the top polarizer resulting in a bright state at null voltage. Similarly, in the transmission pixel, the incoming S wave from backlight is rotated by the TN cell by 90° and becomes P wave. This P wave transmits the top polarizer and results in a bright image.

Figure 5A:
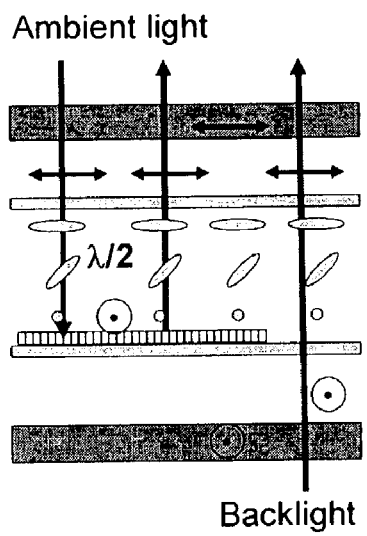
FIGS. 5a and 5b depict another embodiment of the invention using a 90°-TN cell, with FIG. 5a showing the voltage-off state and 5b showing the voltage-on state.
Figure 5B:
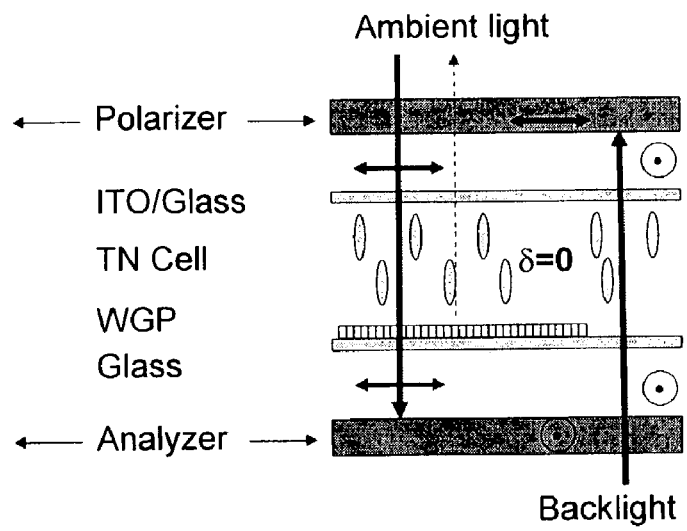

In the high voltage regime, the LC directors are reoriented along the electric field direction, as shown in the right diagram of FIGS. 5a and 5b. Neither ambient nor backlight sees any phase retardation. Therefore, a black state is observed.

Referring to FIGS. 5a and 5b, a normally white transflective display employs a 90° twisted nematic (TN) cell, with FIG. 5a showing the voltage-off state and FIG. 5b showing the voltage-on state.

Figure 6:
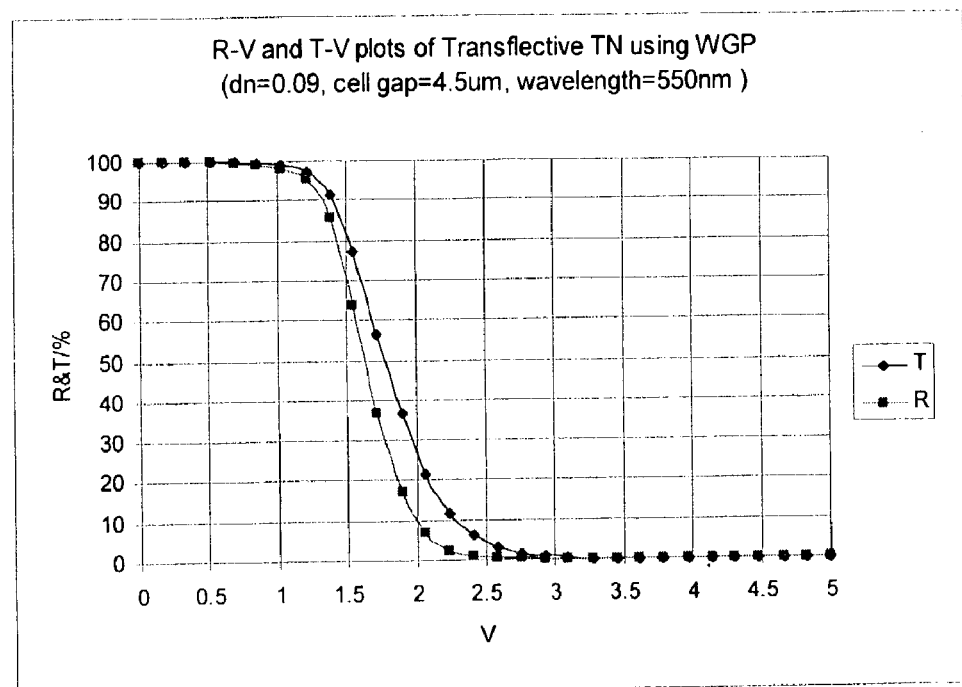
FIG. 6 shows the computer simulated VT and VR plots for the NW mode using a 90° TN cell.

The computer simulation results of the NW mode are plotted in FIG. 6. The VT and VR curves have rather similar gray scales. The dark state voltage is around $3V_{rms}$. The low operating voltage results in low power consumption which is particularly essential for mobile displays.

Simple Device Fabrication

Figure 7:
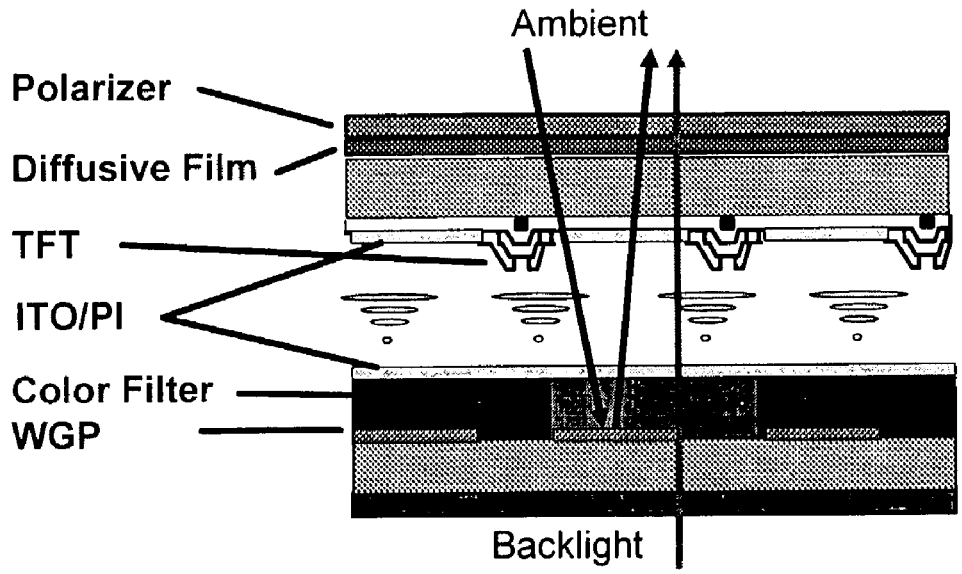
FIG. 7 shows a device embodiment of the invention.

In a single polarizer reflective LCD (see Wu and Yang, Reflective Liquid Crystal Displays, Wiley-SID, 2001), the thin-film-transistor (TFT) can be imbedded beneath the aluminum reflector. A major advantage is that TFT aperture ratio is increased to about 90%. However, the fabrication process is much more sophisticated. In this invention, a transmission-type TFT substrate can be used, as shown in FIG. 7. In FIG. 7, the TFTs and WGP reflectors are in different substrates and can be fabricated separately with high yield.

No Phase Retardation Film Required

Usually, the single polarizer reflective LCD without a quarter-wave film exhibits a poor contrast ratio (<10:1) because the polarizer acts as two parallel polarizers. In this invention, the wire grid polarizer and the top sheet polarizer together serve as crossed polarizers for the reflective pixels. On the transmissive pixels, two polarizers are crossed. Therefore, this invention provides a high contrast ratio while not requiring any phase retardation film.

Extension of this Invention

Figure 8A:
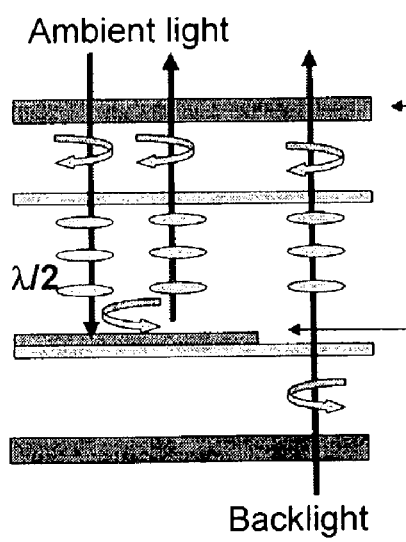
FIG. 8a shows a normally white mode using a broadband cholesteric reflector (BCR), two circular polarizers and a homogenous LC cell with the voltage in an off-state.
Figure 8B:
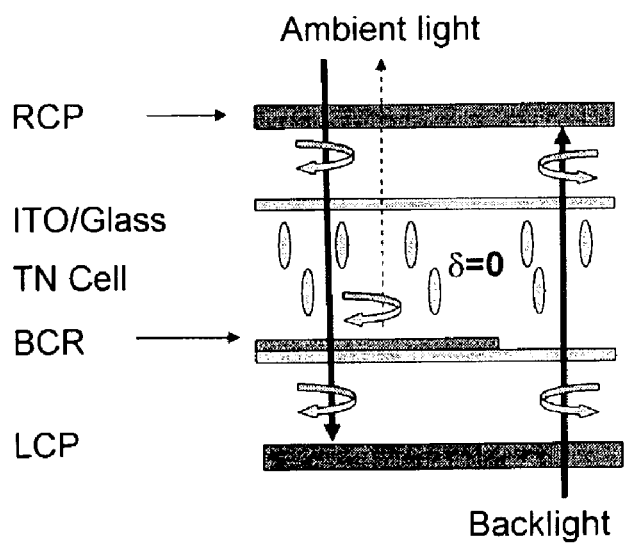
FIG. 8b shows FIG. 8a with the voltage in an on-state.
Figure 8B:
Figure 8B:

The wire grid polarizer is often fabricated by either electron beam etching or a holographic method. To replace WGP, one could deposit a broadband cholesteric reflector (BCR) as shown in FIGS. 8a and 8b. The BCR can be achieved by using a gradient pitch cholesteric liquid crystal [as published by D. Broer et al, Asia Display'95, p.735–8]. Under this circumstance, two circular instead of linear polarizers are used. Both normally white (FIGS. 8a & 8b) and normally black (FIGS. 9a & 9b) modes can be obtained.

Normally White Mode

FIGS. 8a and 8b represent the voltage OFF and ON states, respectively. In the voltage-off state, the top right-hand circular polarizer (RCP) transmits the left-hand polarization of the ambient light. The homogeneous cell has phase retardation equivalent to a half wave plate, i.e., $d\Delta n=\lambda/2$, where d is the cell gap, $\Delta n$ is the LC birefringence and $\lambda$ is the wavelength. After passing the half-wave LC layer, the left-hand circular wave becomes a right-hand circular wave. Upon reflection from the BCR, the right-hand wave stays unchanged. This is a key feature of the cholesteric reflector. The right-hand wave traverses the LC layer one more time and its polarization is rotated to left hand and gets transmitted by the top right-handed circular polarizer. Similarly, the backlight is also transmitted resulting in a bright state at null voltage.

In a high voltage state, the LC directors are reoriented by the electric field so that its phase retardation vanishes. The incident ambient light transmits through the BCR and is absorbed by the bottom circular polarizer. The backlight that transmits through the bottom polarizer is blocked by the top polarizer. As a result, the dark state appears.

Normally Black Mode

Another embodiment is to use vertical LC alignment and negative dielectric anisotropy ($\Delta\epsilon<0$) LC material. The operating mechanisms are illustrated in FIGS. 9a & 9b. FIGS. 9a & 9b represent the voltage-off and -on states, respectively. In the voltage-off state, the LC directors are perpendicular to the substrate surfaces. Thus, its phase retardation is zero, i.e., $\delta=0$. The ambient light is blocked by the bottom polarizer and the backlight is blocked by the top polarizer, resulting in a good dark state. When the voltage is ON such that the LC layer becomes a half-wave plate, the ambient light is reflected and backlight is transmitted. A bright state is observed.

The invention has applications for use with commercial products such as Gameboy, Personal Digital Assistant (PDA) devices and other types of handheld devices having displays.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A device for single cell gap reflective and transflective liquid crystal displays comprising:
    (a) a single cell gap liquid crystal display (LCD) having reflective pixels and transmissive pixels;
    (b) a wire grid polarizer (WGP) solely covering the reflective pixels;
    (c) ambient light means reflecting off the reflective pixels; and,
    (d) means allowing back light passing through the transmissive pixels,
whereby the cell gap LCD achieves high contrast ratios without using phase retardation films.

2. The device of claim 1, further comprising:
    an alignment layer covering the transmissive pixels.

3. The device of claim 2, wherein the alignment layer includes:
    indium-tin-oxide (ITO) and polymide (PI).

4. The device of claim 1, further comprising:
    an ITO/PI layer above and another ITO/PI layer below the cell gap.

5. The device of claim 1, further comprising:
    (a) an upper polarizer layer above the cell gap; and,
    (b) a lower polarizer layer below the cell gap.

6. The device of claim 4, further comprising:
    (a) an upper polarizer layer above the cell gap LCD; and,
    (b) a lower polarizer layer below the cell gap LCD.

7. The device of claim 1, wherein the wire grid polarizer is formed by an ion beam etching process.

8. The device of claim 1, wherein the wire grid polarizer is formed by a holographic method.

9. The device of claim 1, further comprising:
    a thin-film-transistor (TFT) above the cell gap LCD, wherein.

10. The device of claim 1, further comprising:
    a broadband cholesteric reflector (BCR) as a replacement for the wire grid polarizer.

11. A device for single cell gap reflective and transflective liquid crystal displays, comprising:
    (a) a single cell gap liquid crystal display (LCD) having reflective pixels and transmissive pixels;
    (b) a broadband cholesteric reflector (BCR) solely covering the reflective pixels;
    (c) means for reflecting the ambient light off the reflective pixels; and,
    (d) means for passing back light through the transmissive pixels whereby the single cell gap LCD achieves high contrast ratios without using phase retardation films.

12. A method of using single cell gap liquid crystal displays (LCDs) without phase retardation films, comprising the steps of:
    (a) providing a single cell gap LCD having reflective pixels and transmissive pixels;

(b) covering solely the reflective pixels with at least one of: a wire grid polarizer (WGP) and a broadband cholesteric reflector (BCR);
(c) reflecting ambient light off the reflective pixels; and,
(d) passing back light through the transmissive pixels whereby the cell gap LCD obtains high contrast ratios without using phase retardation films.

13. The method of claim 12 wherein said covering is with a WGP.

14. The method of claim 12 wherein said covering is with a broadband cholesteric reflector (BCR).

15. The method of claim 14 wherein said covering is also with a WGP.

* * * * *